US006851175B2

(12) United States Patent
Brown et al.

(10) Patent No.: US 6,851,175 B2
(45) Date of Patent: Feb. 8, 2005

(54) WOUND STATOR CORE AND METHOD OF MAKING

(75) Inventors: David L Brown, Westfield, IN (US); Gerald R Stabel, Swartz Creek, MI (US); Robert Anthony Lawrence, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 167 days.

(21) Appl. No.: 09/950,853

(22) Filed: Sep. 12, 2001

(65) Prior Publication Data

US 2003/0048032 A1 Mar. 13, 2003

(51) Int. Cl.[7] .............................................. H02K 15/16
(52) U.S. Cl. ............................ 29/596; 29/605; 29/606; 29/732; 310/179
(58) Field of Search ............................ 29/596, 598, 605, 29/606, 732, 735; 242/432; 310/179, 180, 194

(56) References Cited

U.S. PATENT DOCUMENTS

| 3,845,548 | A | * | 11/1974 | Arnold | 29/596 |
|---|---|---|---|---|---|
| 4,033,385 | A | * | 7/1977 | Taube | 140/92.1 |
| 4,053,111 | A | * | 10/1977 | Eminger | 242/432.5 |
| 4,106,189 | A | * | 8/1978 | Peters | 29/736 |
| 4,307,311 | A | * | 12/1981 | Grozinger | 310/179 |
| 4,641,421 | A | * | 2/1987 | Stanley | 29/596 |
| 4,741,093 | A | * | 5/1988 | Rist | 29/596 |
| 5,454,156 | A | * | 10/1995 | Morr | 29/596 |
| 5,732,900 | A | | 3/1998 | Burch | 242/432.5 |
| 5,860,615 | A | | 1/1999 | Burch | 242/432.5 |
| 5,895,004 | A | | 4/1999 | Burch | 242/432.3 |
| 5,946,796 | A | | 9/1999 | Burch | 29/736 |
| 5,964,429 | A | | 10/1999 | Burch et al. | 242/432.2 |
| 6,206,319 | B1 | | 3/2001 | Burch | 242/432.4 |
| 6,278,213 | B1 | | 8/2001 | Bradfield | |
| 6,477,762 | B1 | * | 11/2002 | Sadiku | 29/596 |
| 6,563,247 | B2 | | 5/2003 | Nguyen | |
| 2001/0010441 | A1 | | 8/2001 | Luttrell | 310/184 |

FOREIGN PATENT DOCUMENTS

| JP | 10164805 2 | 6/1998 |
|---|---|---|
| JP | 11275791 8 | 10/1999 |
| JP | 2000116078 | 4/2000 |
| JP | 2000278902 | 10/2000 |

* cited by examiner

Primary Examiner—David P. Bryant
Assistant Examiner—Stephen Kenny
(74) Attorney, Agent, or Firm—Jimmy L. Funke

(57) ABSTRACT

A method of inserting coils in slots of a stator is provided. The method includes interleaving a first set of first phase windings and a first set of second phase windings on an insertion tool. The method also includes activating the insertion tool to radially insert the first set of first phase windings and the first set of second phase windings in the slots of the stator. In one embodiment, interleaving the first set of first phase windings and the first set of second phase windings on the insertion tool includes forming the first set of first phase windings in first phase openings defined in the insertion tool, and forming the first set of second phase windings in second phase openings defined in the insertion tool.

10 Claims, 8 Drawing Sheets

WOUND STATOR CORE AND METHOD OF MAKING

STATEMENT REGARDING FEDERALLY SPONSORED RESEARCH OR DEVELOPMENT

The U.S. Government may have a license in this invention and the right in limited circumstances to require the patent owner to license to others on reasonable terms as provided for by the terms of Contract No. DE-FC08-00NV13673.

TECHNICAL FIELD

This application relates to stators for electric machines. More specifically, this application relates to a method and apparatus for providing coils of windings in stator cores having increased slot fill percentage and reduced end turn heights.

BACKGROUND

Electric machines (e.g., motors or generators) have a stator secured within a housing. A rotor is mounted on a shaft and is positioned within the stator. The rotor is rotatable relative to the stator about the longitudinal axis of the shaft.

SUMMARY

A method of inserting coils in slots of a stator is provided. The method includes interleaving a first fraction of first phase windings and a first fraction of second phase windings on an insertion tool. The method also includes activating the insertion tool to radially insert the first fraction of first phase windings and the first fraction of second phase windings in the slots of the stator. In one embodiment, interleaving the first set or fraction of first phase windings and the first fraction of second phase windings on the insertion tool includes forming the first fraction of first phase windings in first phase openings defined in the insertion tool; and forming the first fraction of second phase windings in second phase openings defined in the insertion tool.

A method of winding a stator is provided. The method includes forming a first coil and a second coil on an insertion tool such that the coils are disposed in a set of first and second openings, respectively, defined in the insertion tool. The method further includes mounting the stator on the insertion tool in an aligned position. Here, the aligned position aligns a set of first slots defined in the stator with the set of first openings and a set of second slots defined in the stator with the set of second openings. The method further includes controlling the insertion tool to radially extend a plurality of strippers to urge the first coil in the set of first slots and to urge the second coil in the set of second slots.

A wound stator is provided. The stator includes a stator core, a first phase winding, and a second phase winding. The stator core has a central bore for receiving a rotor of an electric machine. The central bore includes first phase winding slots and second phase winding slots formed in an alternating arrangement therein. The first phase winding is in the first phase winding slots. Similarly, the second phase winding is in the second phase winding slots. Here, the first and second phase windings are disposed in the first and second phase winding slots by radially inserting the first and second phase windings from a tool having the first and second phase windings interleaved thereon.

The above-described and other features and advantages of the present invention will be appreciated and understood by those skilled in the art from the following detailed description, drawings, and appended claims.

DESCRIPTION OF THE PREFERRED EMBODIMENT

Figure 1:
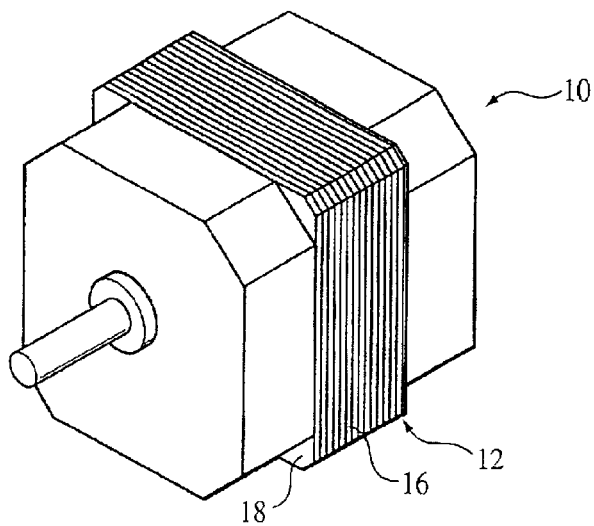
FIG. 1 is a perspective view of an electric machine.
Figure 2:
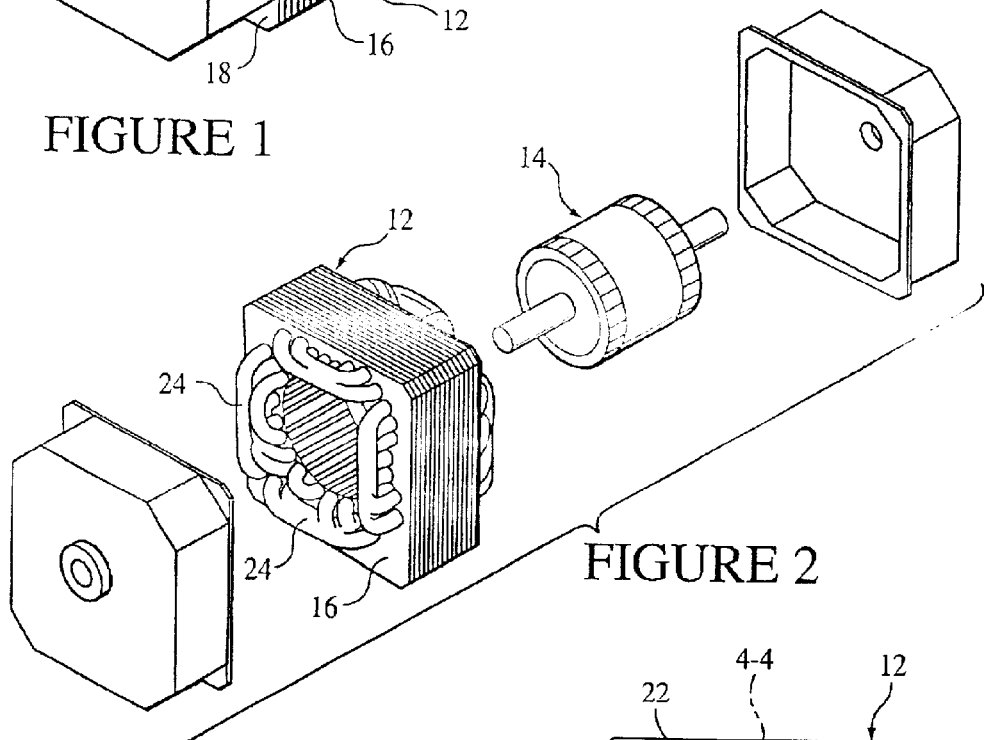
FIG. 2 is an exploded view of the electric machine of FIG. 1.
Figure 3:
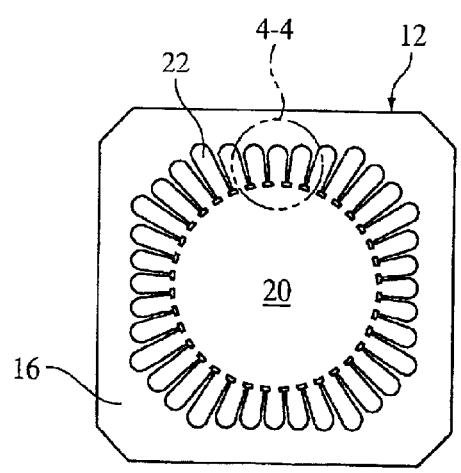
FIG. 3 is a top view of a stator.

Referring now to FIGS. 1–3, an electric machine 10 is provided by way of example. Electric machine 10 includes a stator core 12 and a rotor 14. Stator core 12 is formed of a stack of layers 16. Layers 16 are made of materials including, but not limited to, steel, electrical steel (e.g., steel having high silicone content), black iron, and other electrically conductive materials. Here, each layer 16 is coated with an electrically non-conductive insulating coating 18. Thus, stator core 12 alternates between layer 16 and coating 18.

An example layer 16 of stator core 12 is illustrated in FIG. 3. Here, layer 16 includes a central bore 20 for receiving rotor 14 and a plurality of spaced apart slots 22 for receiving motor windings or wires 24. Layers 16 are stacked such that slots 22 are axially aligned with one another to form the individual poles of stator core 12. After stacking layers 16, slots 22 are provided with a layer of electrically non-conductive insulation 23 between slots 22 and motor windings 24 (best seen in FIG. 4). Insulation 23 is, for example, an insulating paper, plastic, epoxy, insulating coating or other electrically insulating materials. After insertion of motor windings 24, a non-conductive retaining clip or wedge 28 is inserted to secure the windings in slots 22 and insulate the windings from tooth tips 26 (described below).

It should be recognized that stator core 12 is described above by way of example only as including layers 16. Of course, and as other applications require, use of continuously wound stator cores, segmented stator cores, solid metal cores, and the like are considered within the scope of the present invention.

The efficiency and maximum power generated by motor 10 is dependant, among other factors, on the percent slot fill and the end turn height of windings 24. The percent slot fill is referred to herein as the percentage of slot 22 that has been filled with windings 24 (best seen in FIG. 4). The end turn height is referred to herein as the height of windings 24 that extend above/below stator core 12 (best seen in FIG. 2). For example, a percent slot fill of one hundred and an end turn height of zero would provide motor 10 with the greatest efficiency and power possible for the relative size of stator 12.

A small or minimal end turn height is desired for several reasons. First, the material in windings 24 above slot 22 provides extra electrical resistance to motor 10, which decreases the motor's efficiency. This extra material also increases the cost of the motor by increasing the cost of windings 24. Moreover, the extra material in the end turn unnecessarily increases the weight and size of motor 10.

A high or maximum percent slot fill is also desired for several reasons. A high slot fill percentage results in a large mass of windings 24, and thus of electrical pathway for current to travel, through stator 12. The higher the slot fill percentage, the more power that motor 10 generates.

The use of motor 10 in hybrid or electric vehicles is driving the need in the industry for smaller, more powerful motors. Accordingly, motor 10 with a high slot fill percentage and a low end turn height find particular use not only in such automotive applications, but also in many other fields of use where efficiency and/or reduced size and weight are desired.

It has been found that the method in which windings 24 are wound about one another and are inserted in slots 22 has a direct impact on the end turn height and the percent slot fill. However, various parameters of motor 10 and stator 12 effect placement of windings 24 in slots 22.

Figure 4:
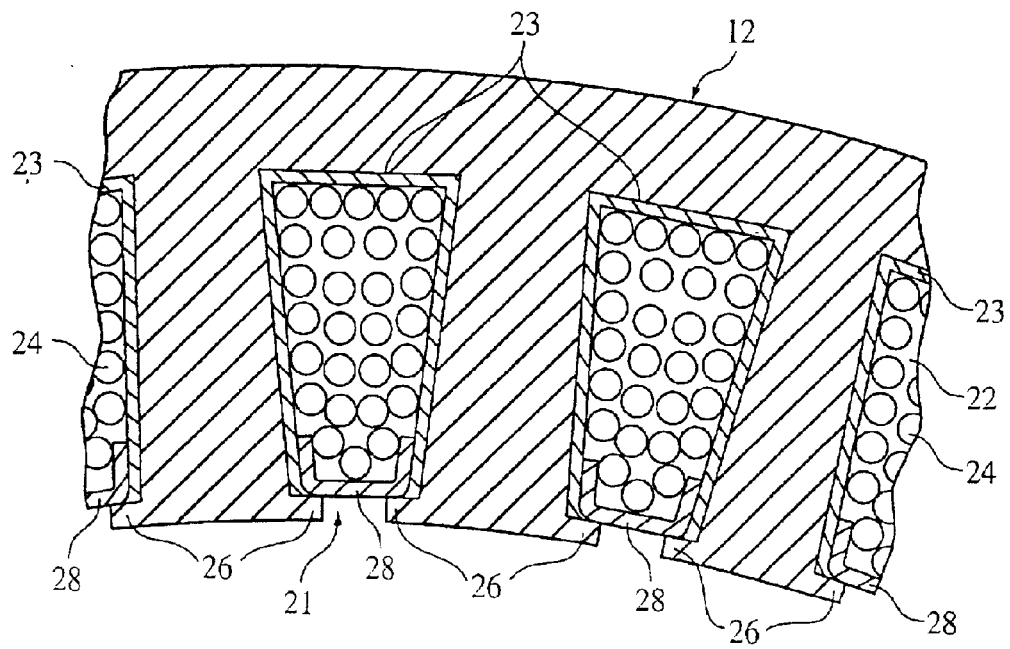
FIG. 4 is a detailed view of the stator of FIG. 3, taken from circle 4—4.

For example, and as illustrated in FIG. 4, slots 22 commonly include tooth tips 26 disposed at the open end of the slots. Thus as a result of tooth tips 26, slots 22 have a restricted opening or gap 21, which increase the difficulty of inserting windings 24 in the slots. Similarly, other parameters of motor 10 and/or stator 12 effect placement of windings 24 in slots 22.

In-slot winding methods have been developed that place the individual wires of windings 24 directly in slots 22 through gap 21. However, and as described in more detail below, such in-slot winding methods do not provide for desired slot fill percentages. Additionally, due to the time required to individually wind each wire of winding 24 in slot 22, these in-slot winding methods do not provide for desired cycle time or speed of manufacture.

Figure 5:
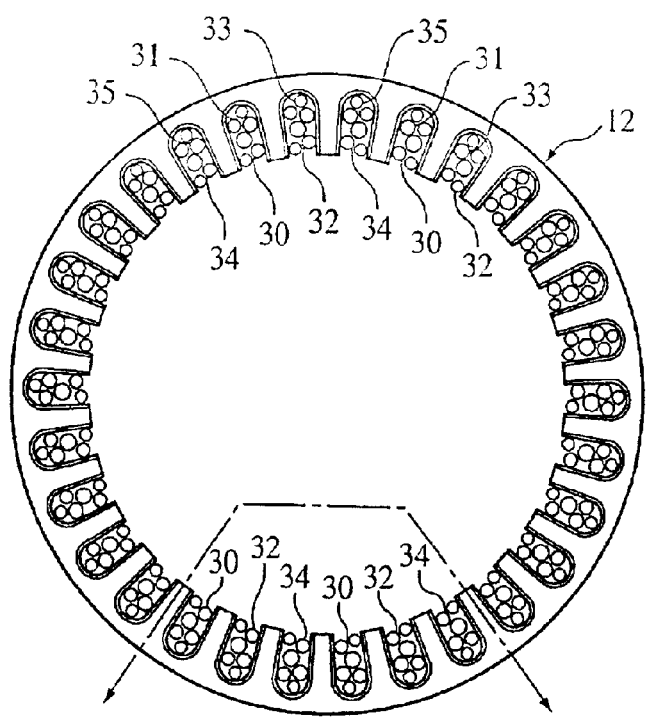
FIG. 5 is a top view of a stator for a three-phase motor.

Axial insertion methods have also been developed. Here, windings 24 are axially placed or inserted in slots 22. However, such axial insertion is also made difficult by various parameters of motor 10. For example, axial insertion methods are exposed to high friction during insertion in instances where core 12 includes a large number of slots 22 and/or is tall. As illustrated in FIG. 5, stator 12 has thirty slots 22 divided among three phases, first phase slots 30, second phase slots 32, and third phase slots 34. Thus, motor 10 having such a stator 12 also has three phases.

In this example, there are ten each of first phase slots 30, second phase slots 32, and third phase slots 34. The phase slots alternate sequentially around the perimeter of stator 12 from the first phase slot 30, to the second phase slot 32, to the third phase slot 34 as illustrated. Thus, there is a one-to-four throw between phase slots.

Figure 6:
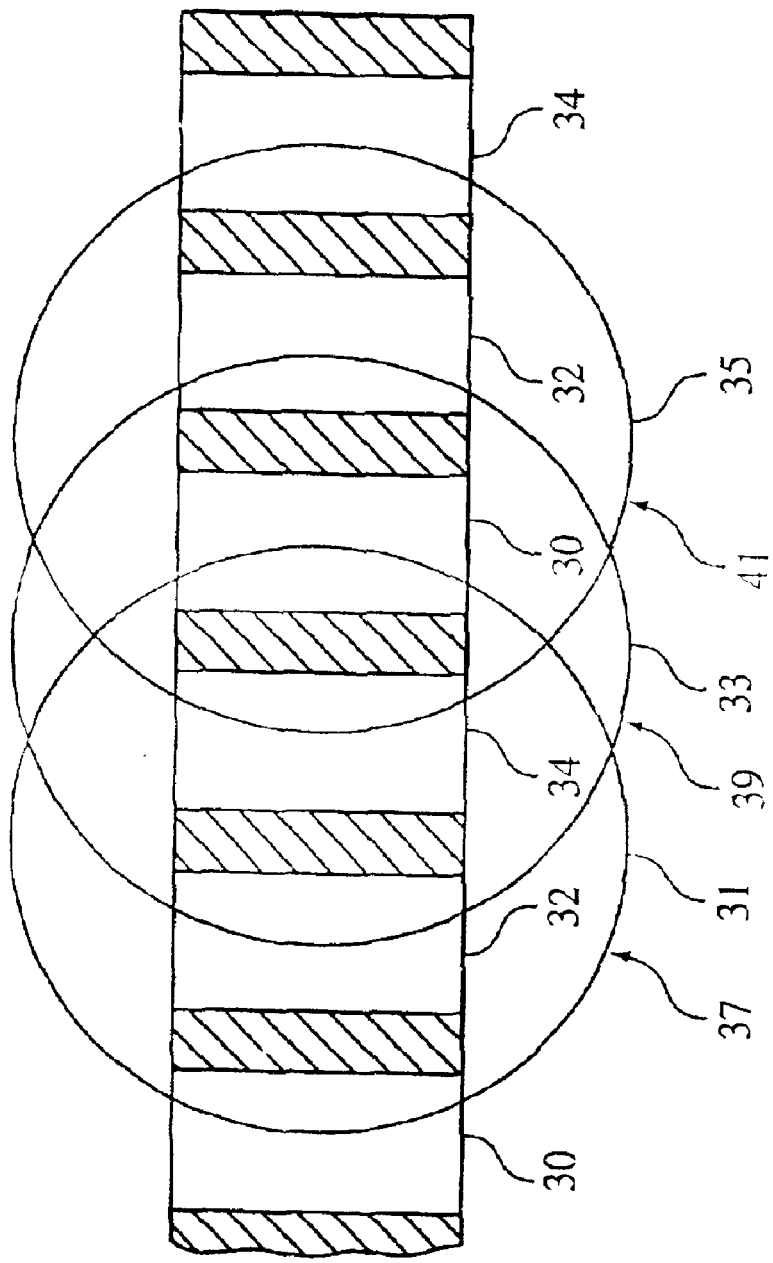
FIG. 6 is a detailed view of the stator of FIG. 5, taken from section 6—6.

More specifically, a coil 25 of windings 24 is placed in two slots 22 of each phase. Referring now to FIG. 6, first phase coils 37 of windings 31 are placed in first phase slots 30, second phase coils 39 of windings 33 are placed in second phase slots 32, and third phase coils 41 of windings 35 are placed in third phase slots 34. In the one-to-four throw arrangement, coils 37, 39 and 41 of windings 31, 33, and 35, respectively, are placed in every fourth slot. The result is a total of five coils 37, 39, and 41 for each phase.

It should be recognized that motor 10 is described above by way of example. Of course, motor 10 having more or less than thirty slots, more or less than three phases, more or less than five coils per phase, and/or more or less than a one-to-four throw arrangement are considered within the scope of the present invention.

The axial insertion and in-slot insertion methods are described in more detail below by way of example. In this example, stator 12 has three phases, ninety-six slots 22, with a one-to-six throw between phase slots. Thus, stator 12 includes thirty-two first phase slots 30, thirty-two second phase slots 32, and thirty-two third phase slots 34. As a result, sixteen coils 37, 39, and 41 having fifteen individual windings 31, 33, and 35 are placed within phase slots 30, 32, and 34, respectively.

Axial insertion methods are also made difficult by the interrelationship of the direction of insertion, the tooling used to insert windings 24, and the shape of core 12. For example, and as shown in FIG. 6, stator 12 is shown having first phase coils 37 woven through all of first phase slots 30. In typical axial insertion methods, each coil 25 is formed with all of the windings 24 for a particular phase. Then, all of the coils 25 for that phase are inserted, in one insertion action, in slots 22. By inserting all of the coils 25 for a particular phase in slots 22, the axial insertion method enables compression of the windings to ensure a high slot fill percentage.

However, in order to axially insert second phase coils 39 through all of second phase slots 32, the previously inserted first phase coils 37 must be moved out of the way to give access to the second phase slots. Moreover, in order to axially insert third phase coils 41 through all of third phase slots 34, the previously inserted first and second phase coils 37 and 39 must be moved out of the way to give access to the third phase slots. Hence, interference between coils 25 of the various phases results in an undesirably high end-turn height for axial insertion methods.

As can be seen, axial insertion of coils 25 is made difficult and time consuming by the alternating relationship of the phases. Moreover, such axial insertion methods do not provide for desired end turn heights.

Additionally, as the slot fill of the windings increase, the number and magnitude of shorts (e.g., shorts to ground, shorts between phases, and shorts within phases) increases to undesirable levels. Namely, coils 25 of windings 24 are dragged through slots 22 during axial insertion. Thus, burrs and other surface deformities in slots 22 cause breakdowns in paper type insulation 23 (laminated or non-laminated paper) which in turn causes nicks and scratches in windings 24 as they are dragged through the slots, which leads to shorts in the windings. These motors with shorts need to be remanufactured, which increases the cost of the motor. Additionally, the friction caused by dragging coils 25 through slots 22 prevents the use of epoxy type insulation 23 between the slots and the coils, which decreases the thermal efficiency and does not allow for the endturns to be formed against lamination 16.

In the axial insertion method, three of the fifteen individual windings 31 (three-in-hand) are formed on a shed-winding machine (not shown) five times to provide coil 37 having fifteen windings. At which point, an axial insertion machine inserts all sixteen coils 37 axially in slots 30. This three-in-hand, wrapped five times about the shed winding machine, followed by axial insertion is repeated for coils 39 and 41 in slots 32 and 34, respectively.

Of course it should be recognized that in some applications, the parameters of motor 10 (e.g., number of slots 22, positioning of the slots, number of phases, number of coils, and the like) are such that all windings are simultaneously inserted into the stator. Here, all of the coils in the first phase are formed and shed onto the tool, then all windings in the second phase are formed and shed onto tool, and then all windings in the third phase are formed and shed onto tool. Next, all of the coils are axially inserted into slots 22.

A resulting stator 12 is provided having a slot fill of about 70%–75%, an end turn of about 23 mm at one end, an end turn of about 28 mm at the other end (e.g., total end turn height of about 51 mm), and an overall winding weight of about 9½ pounds.

In the in-slot winding method, one winding 31 is axially placed or fed in slots 30, then one winding 33 is axially placed in slots 32, and finally one winding 35 is axially placed in slots 34. This process is repeated until all fifteen windings 31, 33, and 35 are in slots 30, 32, and 34 forming coils 37, 39, and 41, respectively, therein. By feeding one winding 24 of each phase individually, the in-slot insertion method minimizes the interference between the windings of the various phases and, thus, ensures a low end turn height. However, such individual placement of windings 24 results in an undesirably low slot fill percentage.

Here, a resulting stator 12 wound using the in-slot method has a slot fill of about 50–55%, an end turn of about 18 mm at each end (e.g., total end turn height of about 36 mm), and requires an overall weight of windings about 8 pounds.

Additionally, the axial feeding of the individual windings 24 in the in-slot method requires feeding of a small gauge winding. Thus, a high number of passes is necessary to reach the maximum allowable slot fill percentage. Accordingly, cycle time for in-slot feeding is unacceptably slow.

As evidenced by example, the method in which coils 25 and/or windings 24 are wound and inserted in slots 22 has a direct impact on the end turn height and the percent slot fill, and thus overall cost, weight and efficiency of motor 10.

Referring now to FIGS. 7–11, an exemplary embodiment of a radial insertion method of the present invention is illustrated by way of example. Here, similar elements are labeled in multiple of one hundred.

Figure 7:
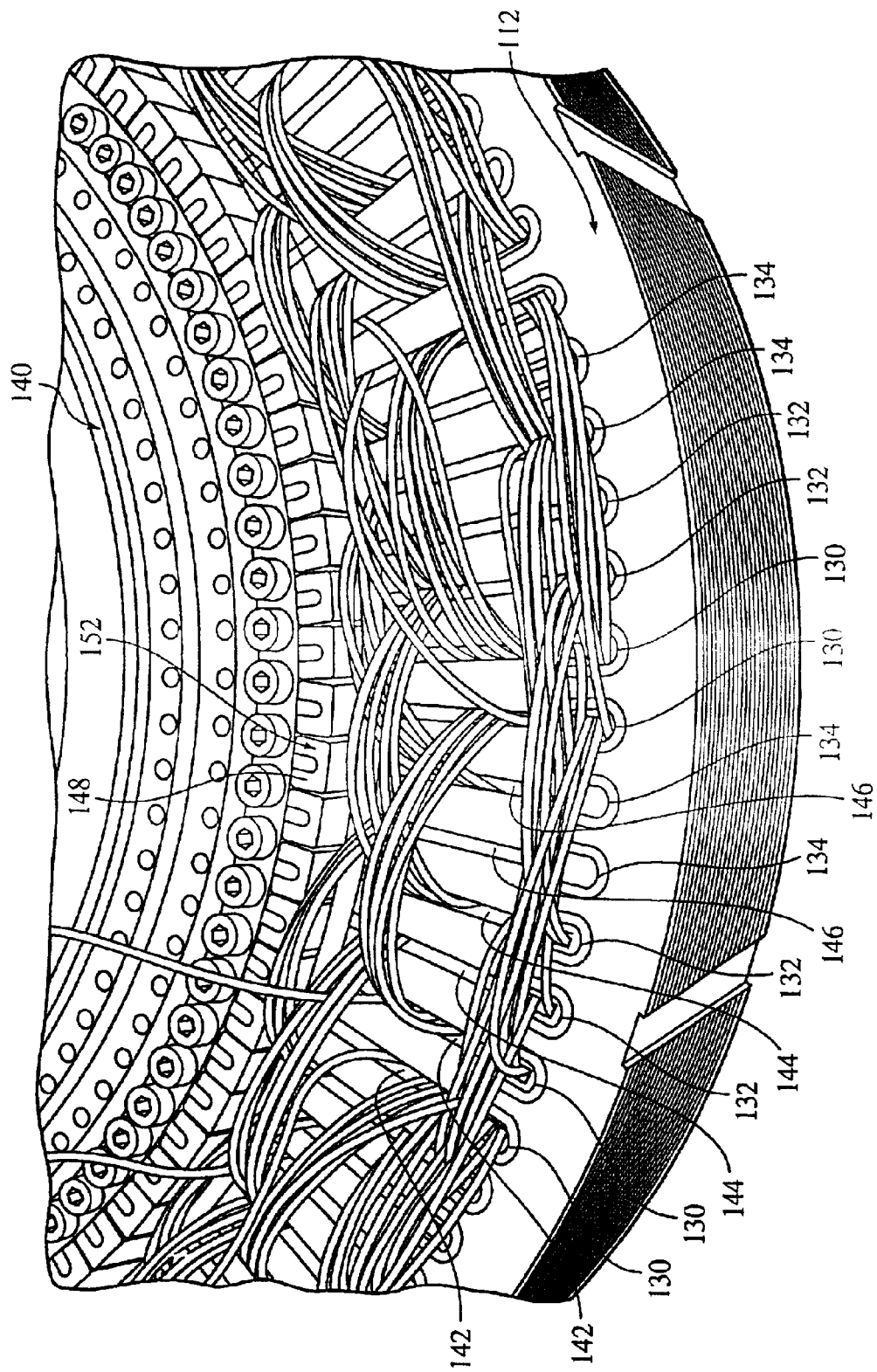
FIG. 7 is a partial perspective view of an exemplary embodiment of a stator on an exemplary embodiment of a radial insertion tool.

Illustrated in FIG. 7, a stator 112 is shown mounted on an exemplary embodiment of a radial insertion tool 140. Similar to the example provided above, stator 112 is for a three-phase motor and includes ninety-six slots 122. Stator 112 also has a one-to-six throw arrangement between phase slots. Thus, stator 112 includes thirty-two first phase slots 130, thirty-two second phase slots 132, and thirty-two third phase slots 134. As a result, sixteen coils 137, 139, and 141 each having a total of fifteen individual first phase windings 131, second phase windings 133, and third phase windings 135 are formed within phase slots 130, 132, and 134, respectively.

Figure 8:
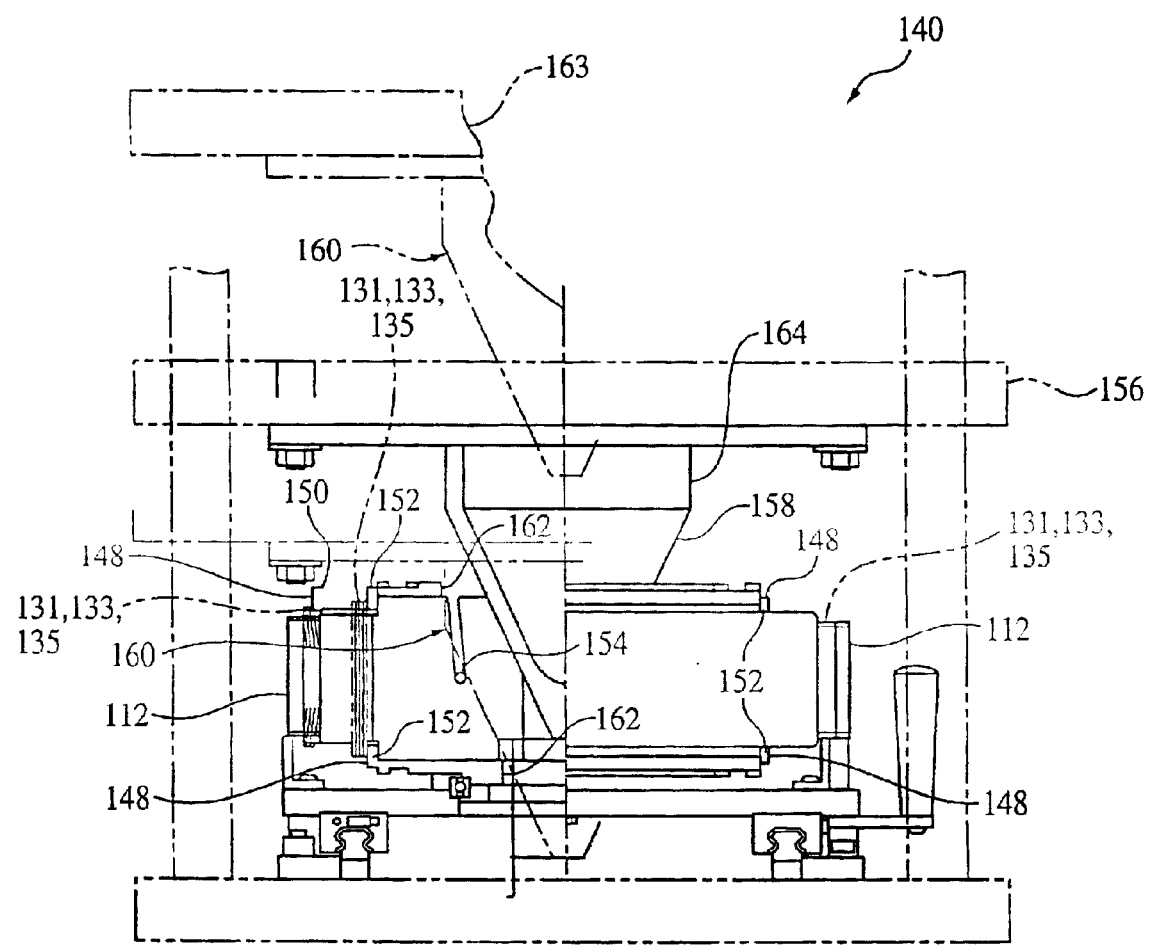
FIG. 8 is a side view, shown in partial cross section, of the radial insertion tool of FIG. 7.
Figure 9:
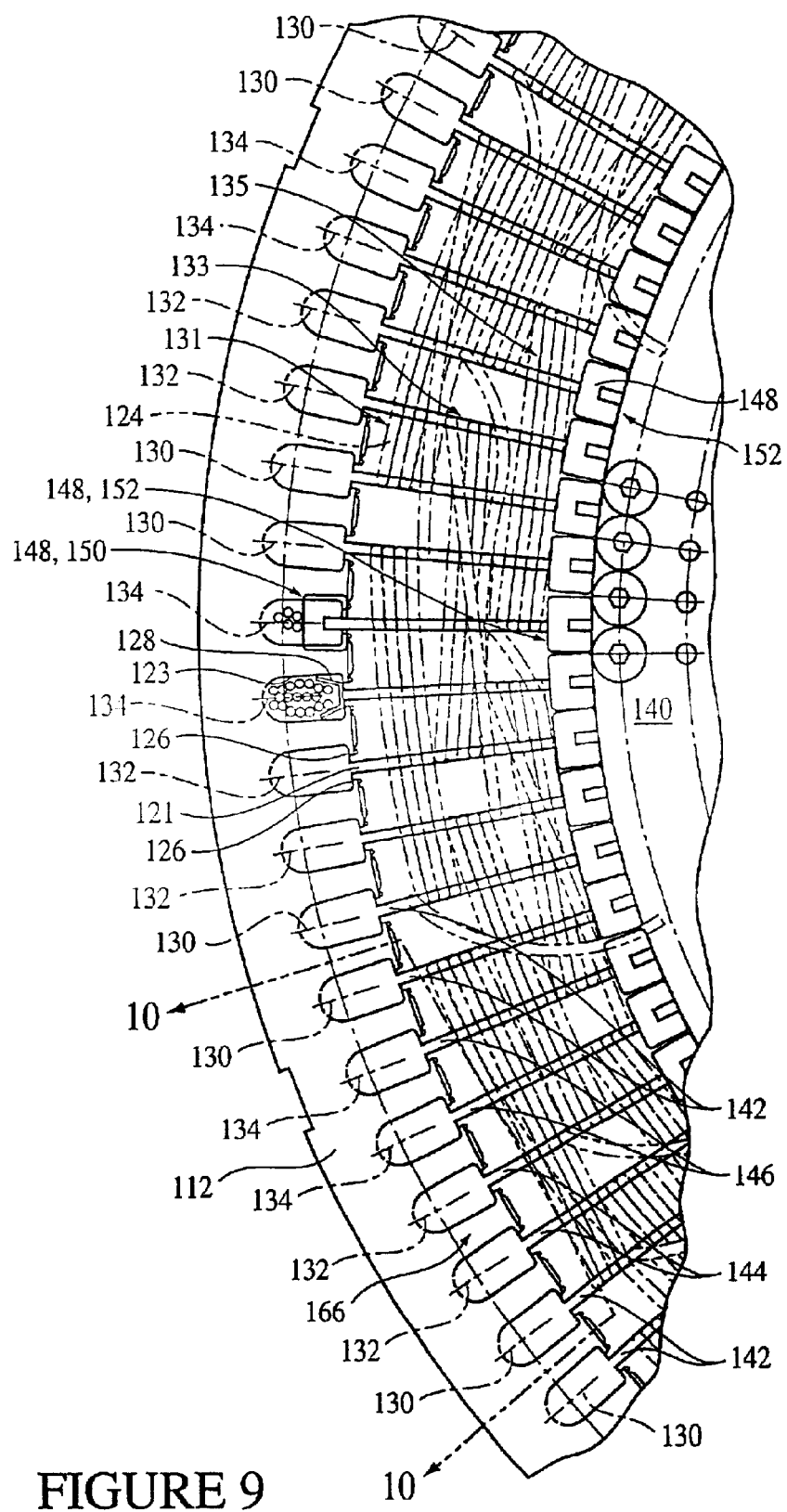
FIG. 9 is a top view of the stator on the radial insertion tool of FIG. 7.

In FIGS. 7–9, stator 112 is illustrated in amounted or aligned position on an exemplary embodiment of radial insertion tool 140. Here, tool 140 includes arms defining a first phase winding opening 142, second phase winding opening 144, and third phase winding opening 146. Stator 112, in the mounted or aligned position, has slots 130, 132, and 134 in radial alignment with openings 142, 144 and 146, respectively.

A coil-forming machine (not shown) is used to form windings 131, 133, and 135 in openings 142, 144, and 146 about the arms, respectively, in an interleaved manner (best seen in FIG. 9). More specifically, stator 112 is moved to an un-mounted or position where slots 130, 132, and 134 are not in alignment with openings 142, 144 and 146, respectively. Thus, in the un-mounted or position, the forming machine has access to openings 142, 144 and 146.

Here, the forming machine forms one of winding 131 (e.g., one wire-in-hand) five times in openings 142 of tool 140, thus leaving a total of wires in the openings (e.g., one/-third of coil 137). Next, the forming machine forms one of winding 133 (e.g., one wire-in-hand) five times in openings 144 tool 140, thus leaving a total of five wires in the openings (e.g., one/-third of coil 139). Finally, the forming machine forms one of winding 135 (e.g., one wire-in-hand) five times in openings 146 of tool 140, thus leaving a total of five wires in the openings (e.g., one/-third of coil 141). The end result of this operation is to form five wires 131, 133, and 135 of each phase in the openings 142, 144, and 146 of the tool 140.

Figure 10:
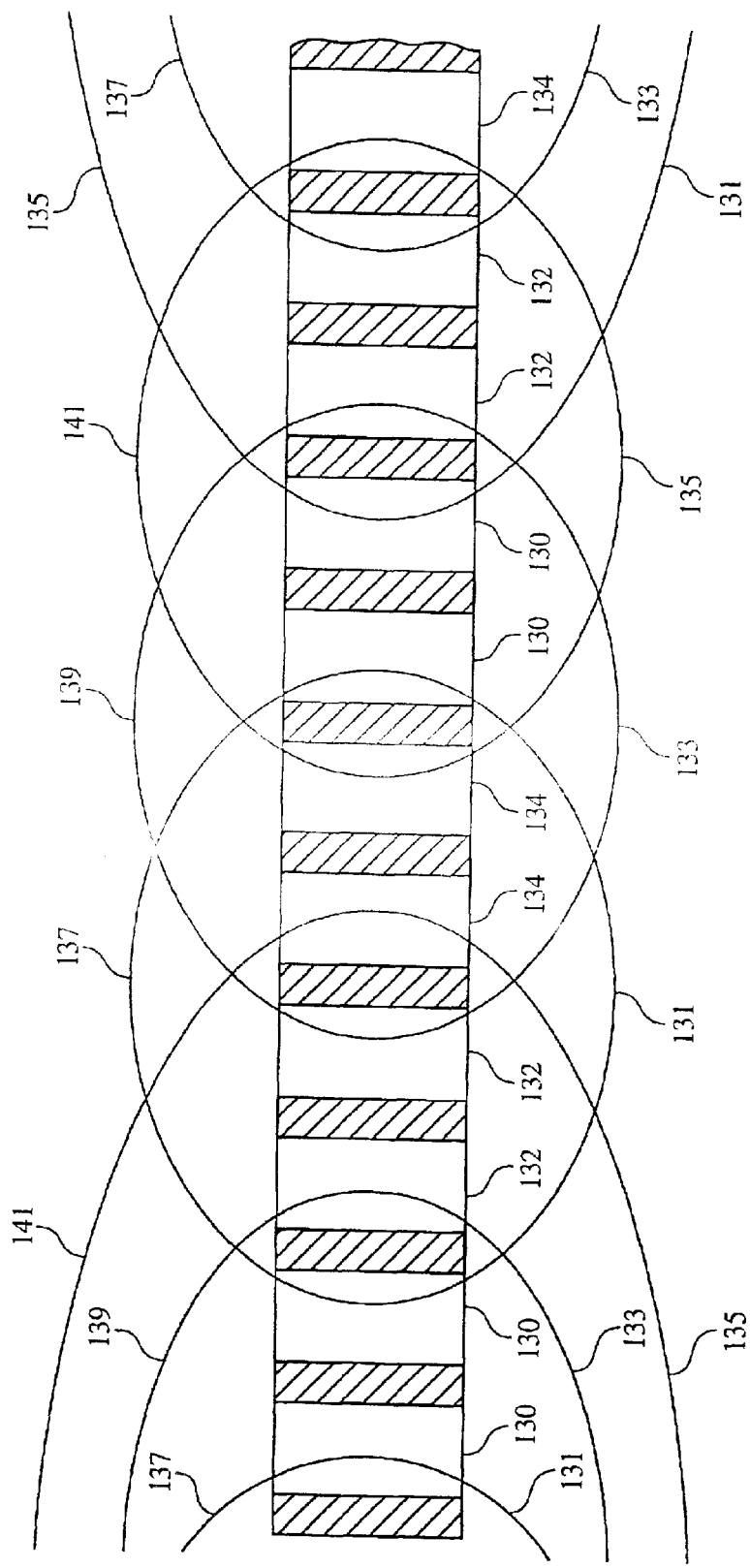
FIG. 10 is a sectional view of the stator of FIG. 9, taken along lines 10—10.

Next, stator 112 is mounted on tool 140 in a position such that openings 142, 144 and 146 are in radial alignment with slots 130, 132, and 134, respectively. Tool 140 includes a stripper finger 148 for each of openings 142, 144, and 146. Stripper fingers 148 are adapted to move radially outward from tool 140 to strip the five windings 131, 133, and 135 from openings 142, 144 and 146. Thus, stripper fingers 148 push the first five of fifteen windings radially into slots 130, 132, and 134 through gaps 121. Stator 112 is illustrated in FIG. 10 having one/-third of coil 137 in slots 130, one/-third of coil 139 in slots 132, and one/-third of coil 141 in slots 134.

Stator 112 is then moved from its mounted position to its un-mounted position, giving the forming machine access to openings 142, 144 and 146. Now, the forming machine repeats the process of having one wire-in-hand and forming that wire five times in openings 142, 144 and 146, respectively, of tool 140 to leave a total of five additional windings 131, 133, and 135 in the openings (e.g., forming a second fraction, one/-third, of coils 137, 139, and 141 in the openings). Stator 112 is illustrated in FIG. 7 having a first fraction, one/-third, of coil 137, 139, and 141 in slots 130, 132, and 134, respectively, and a second fraction, one/-third, of coil 137, 139, and 141 formed in openings 142, 144 and 146, respectively, of tool 140.

Once openings 142, 144 and 146 of tool 140 have five more windings 131, 133, and 135 formed in the openings, stator 112 is then moved back to its mounted position. Next, stripper fingers 148 push the next one/third, five windings 131, 133, and 135 radially in slots 130, 132, and 134 through gaps 121. Thus, the second one/third of coils 137, 139, and 141 are radially inserted in slots 130, 132, and 134.

This process of un-mounting stator 112 from alignment with openings 142, 144 and 146, forming the final one/third, five more windings 131, 133, and 135 in the openings, mounting the stator in alignment with the openings, and extending stripper fingers 148 to push the windings radially in the slots through gaps 121 is repeated to provide coils 137, 139, and 141 having a total of fifteen wires in the slots.

Once coils 137, 139, and 141 are compacted in slots 130, 132, and 134, a non-conductive retaining clip or wedge 128 is inserted to secure the windings in the slots. Of course, the present invention is not limited to securing the windings in the slots by means of wedge 128. Other securing methods, such as, but not limited to epoxy adhesives, tapes and the like are considered within the scope of the present invention.

The forming tool forms windings 131, 133, and 135 in openings 142, 144 and 146 either directly or indirectly. By way of example, direct forming includes the use of a needle winder to directly form windings 131, 133, and 135 in openings 142, 144 and 146. Similarly and by way of example, indirect forming includes the forming of windings 131, 133, and 135 on a shed winder and shedding the windings in openings 142, 144 and 146.

By way of example and with reference to FIG. 8, a partial cross section of an exemplary embodiment of tool 140 is provided illustrating stripper fingers 148. As discussed above, stripper fingers 148 are adapted to move radially outward from tool 140 to strip the five windings 131, 133, and 135 from openings 142, 144 and 146.

More specifically, fingers 148 are configured to move between an extended position 150 (shown in phantom) and a retracted position 152. Fingers 148 are biased to retracted position 152 by a resilient member 154. Thus, fingers 148 are normally retracted to retracted position 152.

Tool 140 includes an upper die 156 having a downwardly depending tapered or cone-shaped press 158. Press 158 includes a cam face 160 adapted to interact with mating cam faces 162 of fingers 148. Upper die 156 is configured to reciprocate press 158 between an upper position 163 (shown in phantom) and a lower position 164.

In upper position 163, cam face 160 of press 158 is out of contact with cam face 162 of fingers 148. However, the movement of press 158 from upper position 163 to lower position 164 causes cam face 160 of press 158 to act on cam face 162 of fingers 148. The action of cam face 160 of press 158 on cam face 162 of fingers 148 overcomes resilient member 154 to drive the fingers radially outward from retracted position 152 to extended position 150. Further, the return of press 158 from lower position 164 to upper position 163 causes resilient member 154 to return fingers 148 from extended position 150 to retracted position 152.

It should be recognized that tool 140 for radially inserting windings 131, 133, and 135 formed in openings 142, 144 and 146 is described above by way of example as having tapered press 158 for moving fingers 148 between the extended position 150 and retracted position 152. Of course, and as other applications, other means for urging coils 137, 139, and 141 in slots 130, 132, and 134 are considered within the scope of the present invention. Other means, such as, but not limited to pneumatic means, hydraulic means, electrical means, and other mechanical means for urging and compacting coils 137, 139, and 141 in slots 130, 132, and 134 are considered within the scope of the present invention.

Figure 11:
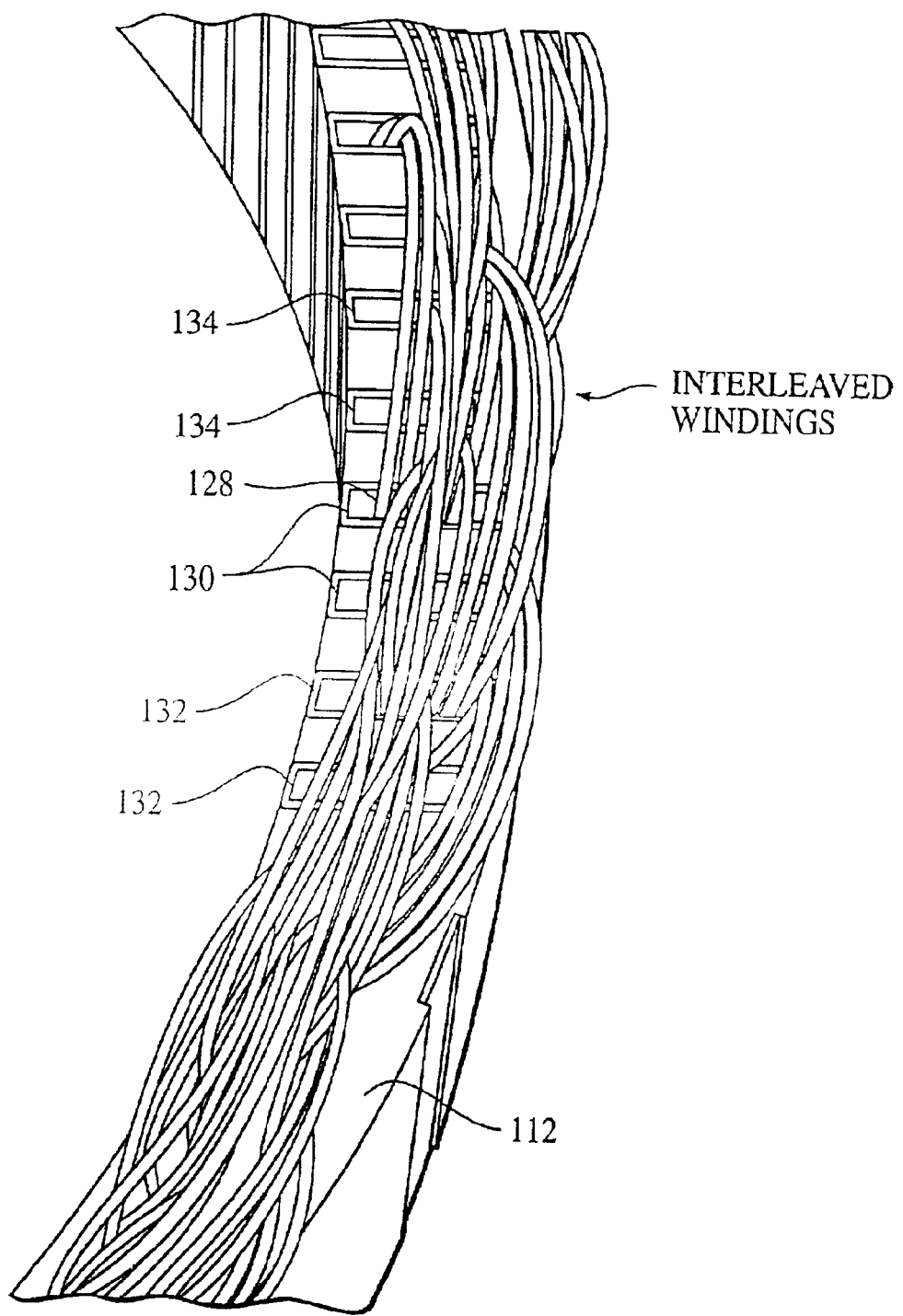
FIG. 11 is a top view of an exemplary embodiment of a stator wound by an exemplary embodiment of a radial insertion method.

Referring to FIG. 11, a completed stator 112 is illustrated having coils 137, 139, and 141 disposed therein by the radial insertion method of the present invention. It has been determined that such a radial insertion method provides stator 112 with increased percentage slot fill of windings 124 as compared to in-slot winding. More specifically, radial insertion allows a packing force to be applied to windings 131, 133, and 135 by tool 140 to pack the windings in slots 130, 132, and 134. Thus, radial insertion enables a higher slot fill percentage as compared to the in-slot winding method.

Moreover, radial insertion also enables the interleaving of windings 131, 133, and 135 for each slot, which decreases the interference between the windings in the slots. Thus, radial insertion provides stator 112 with a reduced end turn height as compared to axial insertion and in-slot winding.

Stator 112 resulting from the radial insertion method has a slot fill of more than about 60%, an end turn of about 15 mm at each end (e.g., total end turn height of about 30 mm), and an overall winding weight of about 8¼ pounds. Accordingly, significant savings and improved performance for stator 112 are provided by the radial insertion method. More specifically, stator 112 resulting from the radial insertion method has a slot fill of about 70%–75%.

To further the comparison of the axial, in-slot and radial insertion methods, it is assumed that stators 12 and 112 have a thickness of 20 mm. Thus, stator 12 having axially inserted coils 37, 39, and 41 has an overall height of 71 mm (e.g., 20 mm stator+51 mm total end turn height) with a slot fill percentage of about 70%–75%. Similarly, stator 12 having in-slot formed coils 37, 39, and 41 has an overall height of 56 mm (e.g., 20 mm stator+36 mm total end turn height) with a slot fill percentage of about 50–55%. However, stator 112 having radially inserted coils 137, 139, and 141 has an overall height of 50 mm (e.g., 20 mm stator+30 mm total end turn height) with a slot fill percentage of about 70%–75%.

The radial insertion method as described herein reduces the shorts to ground and shorts between phases formed by the axial insertion method and enables the use of paper and/or epoxy type insulations 123 between the slots and the windings. Additionally, the radial insertion method as described herein enables the use of larger gauge windings 124 as compared to the in-slot methods, thus allowing for fewer insertion passes and, thus, increased cycle time.

Under certain instances the end turn height provided by the radial insertion method is low enough for windings 131, 133, and 135 to contact stator 112. More specifically and with reference to FIG. 9, stator 112 includes an end turn region 166 defined on the top and bottom of the stator between slots 130, 132, and 134. Reduction of the end turn height to the point where even a portion of windings 131, 133, and 135 contacts end turn region 166 is not desired. Thus, layer of electrically non-conductive insulation 123 is applied to end turn region 166 to prevent such grounding of windings 131, 133, and 135 on stator 112.

Insertion of insulation 123 at end turn region 166 further allows compression of the end turns of windings 131, 133, and 135 to be compressed. More specifically, after all of the windings 131, 133, and 135 have been inserted in stator 112 a compressive force is applied to the end turns to further decrease the end turn height. Here, insulation 123 prevents grounding of windings 131, 133, and 135 on end turn region 166 of stator 112.

As can be seen from this example, the radial insertion method provides for either a more efficient and powerful motor with the same overall dimensions as prior motors, or alternately allows for smaller and more efficient motors with the same overall power as prior motors.

It should be recognized that the radial insertion method is described by way of example for stator 112 being for a three-phase motor that has ninety-six slots having a one-to-six throw arrangement between phases resulting in sixteen coils 137, 139, and 141 for each phase, with each coil having fifteen individual windings 131, 133, and 135. Of course, and as other applications, the radial insertion method described herein being used with stators have more or less phases, slots, coils, windings, and throws and the like are considered within the scope of the present invention.

It should also be recognized that the interleaving of windings 124 for the radial insertion method is described above by way of example only as having windings 124 interleaved in the one wire-in-hand, wrapped five times for each phase method. Moreover, it should be recognized that the interleaving of windings 124 for the radial insertion method is described above by way of example only as requiring three insertions of the five formed windings 124 stator 112.

Of course, and as other applications, the interleaving using more or less than one wire in hand, wrapping more or less than five times, and/or radially inserting more or less than three times are considered within the scope of the present invention. For example, the design of stator 112 having a design not having tooth tips 126 provides slots 122 without restricted opening 121. Here, all of windings 123 are interleaved onto insertion tool 140 with stator 112 in the unmounted or unaligned position. After mounting stator 112 on insertion tool 140, the tool is activated to radially insert all of interleaved windings 123 into the toothless slots 122 of stator 112. Thus, in thus example only one insertion pass is needed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of inserting coils in slots of a stator, comprising:
    interleaving a first fraction of first phase windings and a first fraction of second phase windings on an insertion tool;
    activating said insertion tool to radially insert said first fraction of first phase windings and said first fraction of second phase windings in the slots of the stator, wherein interleaving said first fraction of first phase windings and said first fraction of second phase windings on said insertion tool comprises:
        forming said first fraction of first phase windings in first phase openings defined in said insertion tool; and
        forming said first fraction of second phase windings in second phase openings defined in said insertion tool; and
    un-mounting the stator on said insertion tool such that the slots are not in alignment with said first phase openings and said second phase openings prior to interleaving said first fraction of phase windings and said first fraction of second phase windings on said insertion tool.

2. A method of inserting coils in slots of a stator, comprising:
    interleaving a first fraction of first phase windings and a first fraction of second phase windings on an insertion tool; and
    activating said insertion tool to radially insert said first fraction of first phase windings and said first fraction of second phase windings in the slots of the stator; and
    mounting the stator on said insertion tool such that the slots are in radial alignment with said first phase openings and said second phase openings prior to activating said insertion tool to radially insert said first fraction of first phase windings and said first fraction of second phase windings in the slots of the stator.

3. A method of winding a stator, comprising:
    forming a first coil on an insertion tool such that said first coil is disposed in a set of first openings defined in said insertion tool;
    forming a second coil on said insertion tool such that said second coil is disposed in a set of second openings defined in said insertion tool;
    mounting the stator on said insertion tool in an aligned position, said aligned position having a set of first slots defined in the stator being aligned with said set of first openings and a set of second slots defined in the stator being aligned with said set of second openings; and
    controlling said insertion tool to radially extend a plurality of strippers to urge said first coil in said set of first slots and to urge said second coil in said set of second slots.

4. The method of claim 3, further comprising:
    removing the stator from said insertion tool such that said set of first slots are removed from alignment with said set of first openings and such chat said set of second slots are removed from alignment with said set of second openings.

5. The method of claim 4, further comprising:
    forming another first coil in said set of first openings;
    forming another second coil in said set of second openings;
    mounting the stator on said insertion cool in said aligned position; and
    extending said plurality of strippers to urge said another first coil in said set of first slots and to urge said anther second coil in said set of second slots.

6. The method of claim 5, further comprising:
    securing said another first coil and said another second coil in said set of first slots and said set of second slots.

7. The method of claim 3, wherein controlling said insertion tool to radially extend said plurality of strippers comprises:
    moving a die downwardly such that a cam face of said die acts on said plurality of strippers to move said plurality of strippers radially outward from a retracted position to an extended position.

8. The method of claim 7, further comprising:
    moving said die upwardly such that said cam face no longer acts on said plurality of strippers; and
    returning said plurality of strippers returns to said retracted position when said cam face no longer acts on said plurality of strippers.

9. The method of claim 7, wherein said plurality of strippers pack said first coil and said second coil in said set of first slots and said set of second slots, respectively.

10. The method of claim 3, further comprising: forming a third coil on said insertion tool such that said third coil is disposed in a set of third openings defined in said insertion tool, said aligned position having a set of third slots defined in the stator being aligned with said set of third openings, and said plurality of strippers being configured to urge said third coil in said set of third slots.

* * * * *